US012624505B2

(12) United States Patent
Cho

(10) Patent No.: US 12,624,505 B2
(45) Date of Patent: May 12, 2026

(54) GUIDE TUBE AND HYPERLOOP DEVICE INCLUDING SAME

(71) Applicant: POSCO Co., Ltd, Pohang-si (KR)

(72) Inventor: Woo-Yeon Cho, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 727 days.

(21) Appl. No.: 18/008,565

(22) PCT Filed: Jun. 8, 2021

(86) PCT No.: PCT/KR2021/007139
§ 371 (c)(1),
(2) Date: Dec. 6, 2022

(87) PCT Pub. No.: WO2021/251722
PCT Pub. Date: Dec. 16, 2021

(65) Prior Publication Data
US 2023/0235517 A1     Jul. 27, 2023

(30) Foreign Application Priority Data

Jun. 8, 2020     (KR) ........................ 10-2020-0068947

(51) Int. Cl.
*E01B 25/30*        (2006.01)
*B60L 13/04*        (2006.01)
(Continued)

(52) U.S. Cl.
CPC ............ *E01B 25/305* (2013.01); *B60L 13/04* (2013.01); *B61B 13/08* (2013.01); *B61B 13/10* (2013.01);
(Continued)

(58) Field of Classification Search
CPC ....... B61B 13/08; B61B 13/10; E01B 25/305; E01B 25/30; E01B 2201/04; E01B 25/24; E01B 2201/10; B60L 13/04
See application file for complete search history.

(56) References Cited

U.S. PATENT DOCUMENTS 5,282,424 A * 2/1994 O'Neill ................... B61B 13/08
104/282
9,085,304 B2 * 7/2015 Oster ...................... B60L 13/04
(Continued)

FOREIGN PATENT DOCUMENTS

CN        1264660 A       8/2000
CN        1839231 A       9/2006
(Continued)

OTHER PUBLICATIONS

Office Action issued Oct. 26, 2023 for counterpart European Patent Application No. 21821935.0.
(Continued)

*Primary Examiner* — Cheng Lin
(74) *Attorney, Agent, or Firm* — Morgan Lewis & Bockius LLP

(57) ABSTRACT

A guide tube according to an embodiment of the present invention may comprise: a tube main body member; a rib member arranged in the longitudinal direction of the tube main body member and coupled to the inner surface of the tube main body member; and a rail support member connected to the rib member.

10 Claims, 8 Drawing Sheets

(51) Int. Cl.
  *B61B 13/08* (2006.01)
  *B61B 13/10* (2006.01)

(52) U.S. Cl.
  CPC .......... *E01B 25/30* (2013.01); *E01B 2201/04* (2013.01); *E01B 2201/10* (2013.01)

(56) References Cited

U.S. PATENT DOCUMENTS

| | | | |
|---|---|---|---|
| 11,346,059 B2 * | 5/2022 | Radziszewski | ....... E04B 1/3205 |
| 2016/0229416 A1 * | 8/2016 | Bambrogan | ........... E02D 29/04 |
| 2016/0229646 A1 * | 8/2016 | Bambrogan | ........... B66C 25/00 |
| 2021/0129234 A1 | 5/2021 | Schroeder et al. | |
| 2021/0370992 A1 * | 12/2021 | Radziszewski | ........... B61C 3/00 |

FOREIGN PATENT DOCUMENTS

| | | | | |
|---|---|---|---|---|
| CN | 107406009 A | | 11/2017 | |
| CN | 108340930 A | * | 7/2018 | ............... B61C 3/00 |
| CN | 108372864 A | * | 8/2018 | ............. B61B 13/10 |
| CN | 108639070 A | * | 10/2018 | ............. B60L 13/04 |
| CN | 108657011 A | * | 10/2018 | ............. B61B 13/10 |
| CN | 207931719 U | | 10/2018 | |
| CN | 209128818 U | | 7/2019 | |
| CN | 209276916 U | | 8/2019 | |
| JP | 107-002383 U | | 1/1995 | |
| JP | H10-236765 A | | 9/1998 | |
| JP | 2004083264 A | * | 3/2004 | |
| KR | 20-2000-007841 U | | 5/2000 | |
| KR | 10-2011-0016534 A | | 2/2011 | |
| KR | 20-2013-0004264 U | | 7/2013 | |
| KR | 10-1781433 B1 | | 9/2017 | |
| KR | 10-2017-0125340 A | | 11/2017 | |
| KR | 10-2019-0100212 A | | 8/2019 | |
| WO | 2004/053231 A1 | | 6/2004 | |
| WO | 2020/183027 A1 | | 9/2020 | |

OTHER PUBLICATIONS

International Search Report dated Sep. 16, 2021 issued in International Patent Application No. PCT/ KR2021/007139 (with English translation).

Office Action dated Jun. 26, 2025, issued in corresponding Chinese Patent Application No. 202180040812.7, with an English translation.

* cited by examiner

<u>1</u>

A-A'

(a)

(b)

GUIDE TUBE AND HYPERLOOP DEVICE INCLUDING SAME

CROSS-REFERENCE OF RELATED APPLICATIONS

This application is the U.S. National Phase under 35 U.S.C. § 371 of International Patent Application No. PCT/KR2021/007139, filed on Jun. 8, 2021, which in turn claims the benefit of Korean Application No. 10-2020-0068947, filed on Jun. 8, 2020, the entire disclosures of which applications are incorporated by reference herein.

TECHNICAL FIELD

The present disclosure relates to a guide tube and a hyperloop device including the same.

BACKGROUND ART

In general, in a high-speed train system, capable of about 300 km/h or more, the issues of two types of resistance should be solved depending on the speed. One is to solve exponentially rising air resistance, and the other is to solve friction between a moving vehicle and a track.

A technology introduced for this purpose is a Hyperloop device. Such a hyperloop device is a system for transferring a moving vehicle by magnetic levitation in a sealed tube at a pressure of about 0.001 atmosphere or less.

In such a hyperloop device, while the electromagnetic and mechanical systems are important, it is important to implement a tube structure to maintain a sub-vacuum state of about 0.001 atmosphere or less, accounting for about 50% or more of an initial investment cost.

In addition, a rail support member, a guideway installed in the tube, is required to maintain a straight line since it resists a load of a moving vehicle and guides the moving vehicle. That is, if the rail support member does not maintain a constant displacement tolerance (about 2 mm or less), a problem in which the moving vehicle deviates while driving, or the like, may occur.

A factor directly affecting straightening of the rail support member includes deflection caused by a tube's own weight and the moving vehicle, and driving deflection caused by vibrations generated during driving of the moving vehicle.

In order to control this, an installation position of the rail support member should be adjusted to compensate for deflection caused by the tube's own weight and deflection caused by the moving vehicle at the beginning, and rigidity of the tube should be sufficiently secured to resist vibration.

Such a conventional method is configured to form a supporting point by making a through-hole in the tube to compensate for the initial deflection of the rail support member, connecting a bolt member to the through-hole, and then welding the same. A method of coupling the rail support member to the bolt member is used.

However, this conventional method has a limitation in that it is necessary to form a through-hole in the tube, insert a bolt member thereinto, and then weld to fill a remaining portion of the through-hole.

Such a drilling operation of the through-hole is costly and time-consuming, and in particular, there is a difficulty in forming the through-hole obliquely in the tube so that the through-hole is horizontal with the moving vehicle rather than in a circumferential direction of the tube. In addition, it is necessary to maintain a vacuum state inside the tube by performing infill welding after drilling the through hole, but there is a limit in that the vacuum of the tube cannot be secured depending on the reliability of this operation.

Therefore, there is a need for research on a guide tube and a hyperloop device including the same to improve the above-described problems or limitations.

SUMMARY OF INVENTION

Technical Problem

An aspect of the present disclosure is to provide a guide tube for facilitating installation of a rail support member and a hyperloop device including the same.

Another aspect of the present disclosure is to provide a guide tube capable of improving a problem of deflection caused by an own weight of a tube main body member or vibration of a moving vehicle, and a hyperloop device including the same.

Solution to Problem

According to an aspect of the present disclosure, a guide tube, may include: a tube main body member; a rib member arranged in a longitudinal direction of the tube main body member, and coupled to an inner surface of the tube main body member; and a rail support member connected to the rib member.

The rib member of the guide tube according to an embodiment of the present disclosure may be welded and coupled to the tube main body member made of a metal material formed in a tube shape.

The rib member of the guide tube according to an embodiment of the present disclosure may include a coupling tab portion formed to protrude in a direction of an inner surface of the tube main body member, provided in plural in a longitudinal direction of the tube main body member, and welded and coupled to the inner surface of the tube main body member.

The rib member of the guide tube according to an embodiment of the present disclosure may include a friction damper portion having a slit hole, to which the rail support member is fitted and is connected to a portion of the slit hole, formed therein, so as to absorb vibration energy of the rail support member.

The slit hole of the guide tube according to an embodiment of the present disclosure may be in frictional contact with the rail support member.

The slit hole of the guide tube according to an embodiment of the present disclosure may be formed in a horizontal shape or an inclined shape to a width direction of the rib member.

In addition, the friction damper portion of the guide tube according to an embodiment of the present disclosure may include a buffer spring provided in at least one end portion of the slit hole.

The rail support member of the guide tube according to an embodiment of the present disclosure may include an insertion tab portion fitted to the slit hole, and a stopper portion protruding in at least one direction of the insertion tab portion to form a step portion.

In addition, the rail support member of the guide tube according to an embodiment of the present disclosure may be screwed and coupled to a bolt member, screwed and coupled or welded and coupled to the rib member, to be connected to the rib member via the bolt member.

The rail support member of the guide tube according to an embodiment of the present disclosure may adjust a depth to be screwed and coupled to the bolt member, to adjust a spacing with the rib member.

According to another aspect of the present disclosure, a hyperloop device may include: the guide tube, an electromagnet member coupled to the guide tube and the rail support member; and a moving vehicle having a permanent magnet facing the electromagnet member, a transport of the moving vehicle being adjusted by magnetic force applied between the electromagnet member and the permanent magnet, and having an accommodation space formed therein.

Advantageous Effects of Invention

As set forth above, according to the present disclosure, a guide tube and a hyperloop device including the same have an advantage of being able to facilitate installation of a rail support member.

In another aspect, the guide tube and the hyperloop device including the same of the present disclosure have an advantage of improving a problem of deflection caused by an own weight of a tube main body member or vibrations of a moving vehicle.

However, various and beneficial advantages and effects of the present disclosure is not limited to the above, and will be more easily understood in a process of describing specific embodiments of the present disclosure.

MODE FOR INVENTION

Figure 1:
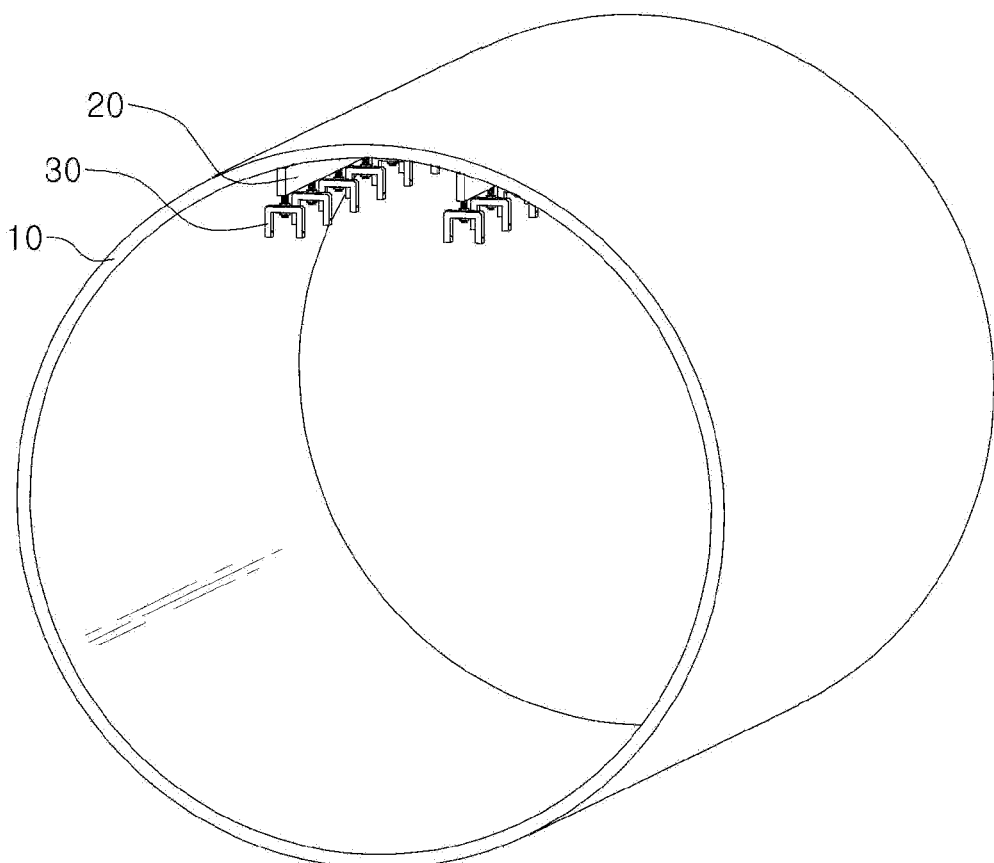
FIG. 1 is a perspective view illustrating a guide tube of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are same elements in the drawings.

In addition, in this specification, the singular expression includes the plural expression unless the context clearly dictates otherwise, and the same reference signs or reference signs assigned in a similar manner throughout the specification refer to the same element or corresponding element.

The present disclosure relates to a guide tube 1 and a hyperloop device including the same, and a rail support member 30 may be easily installed therein. That is, since a rib member 20 having the rail support member 30 installed is coupled to an inner surface of a tube main body member 10 without forming a through-hole on the tube main body member 10, the rail support member 30 may be easily installed.

In another aspect, the guide tube 1 and the hyperloop device including the same may improve a problem of deflection caused by the own weight of the tube main body member 10, vibration of a moving vehicle 3, or the like. That is, it is possible to improve a problem in which the tube main body member 10 is deflected by the rib member 20 disposed in a longitudinal direction of the tube main body member 10. In addition, a friction damper portion 22 may be provided to absorb vibration as frictional force, thereby improving the problem of deflection of the tube main body member 10 due to vibration.

Figure 2:
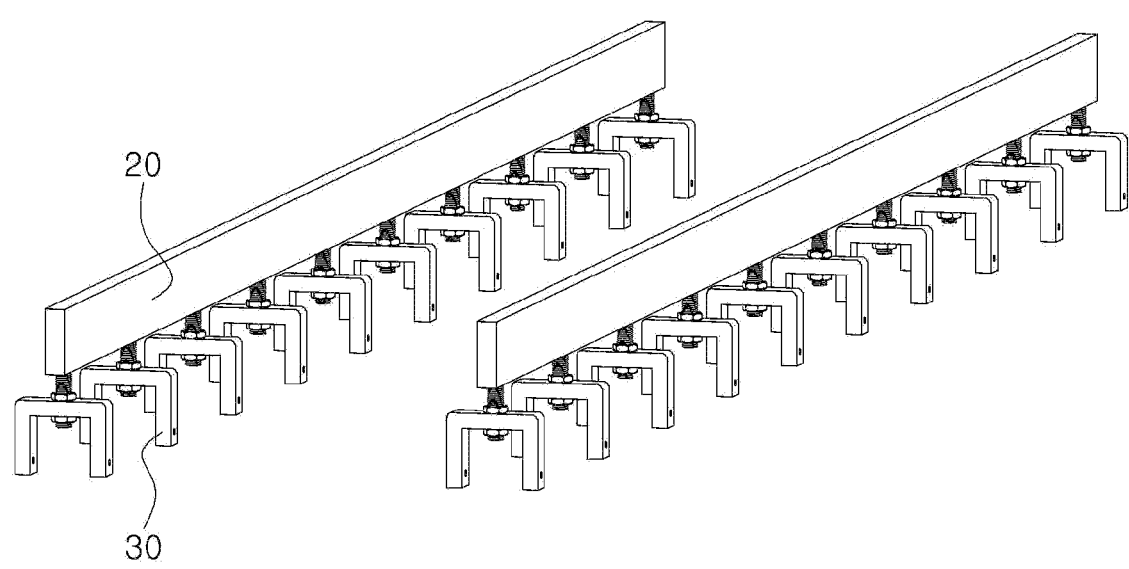
FIG. 2 is a perspective view illustrating a rib member, and a rail support member in the guide tube of the present disclosure.
Figure 3:
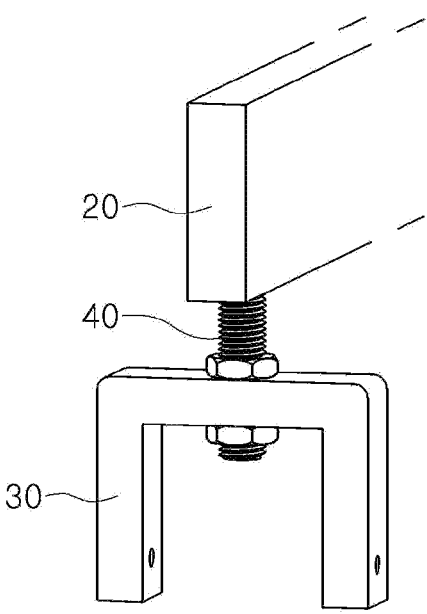
FIG. 3 is a perspective view illustrating a rail support member coupled to the rib member via a bolt member in the guide tube of the present disclosure.

Specifically, referring to the drawings, FIG. 1 is a perspective view illustrating a guide tube 1 of the present disclosure, and FIG. 2 is a perspective view illustrating a rib member 20 and a rail support member 30 in the guide tube 1 of the present disclosure, and FIG. 3 is a perspective view illustrating a rail support member 30 coupled to the rib member 20 via a bolt member 40 in the guide tube 1 of the present disclosure. Referring to the drawings, the guide tube 1 according to an embodiment of the present disclosure may include a tube main body member 10, a rib member 20, and a rail support member 30.

Here, the rib member 20 may be disposed in a longitudinal direction of the tube main body member 10, and may be coupled to the inner surface of the tube main body member 10. The rail support member 30 may be connected to the rib member 20.

As described above, since the rib member 20 is disposed and coupled in the longitudinal direction of the tube main body member 10, it also serves to support the tube main body member 10 in the length direction thereof.

Accordingly, it is possible to improve a problem that the tube main body member 10 is deflected due to inherent weight. This can be confirmed with reference to a simulation result of FIG. 12.

Figure 12:
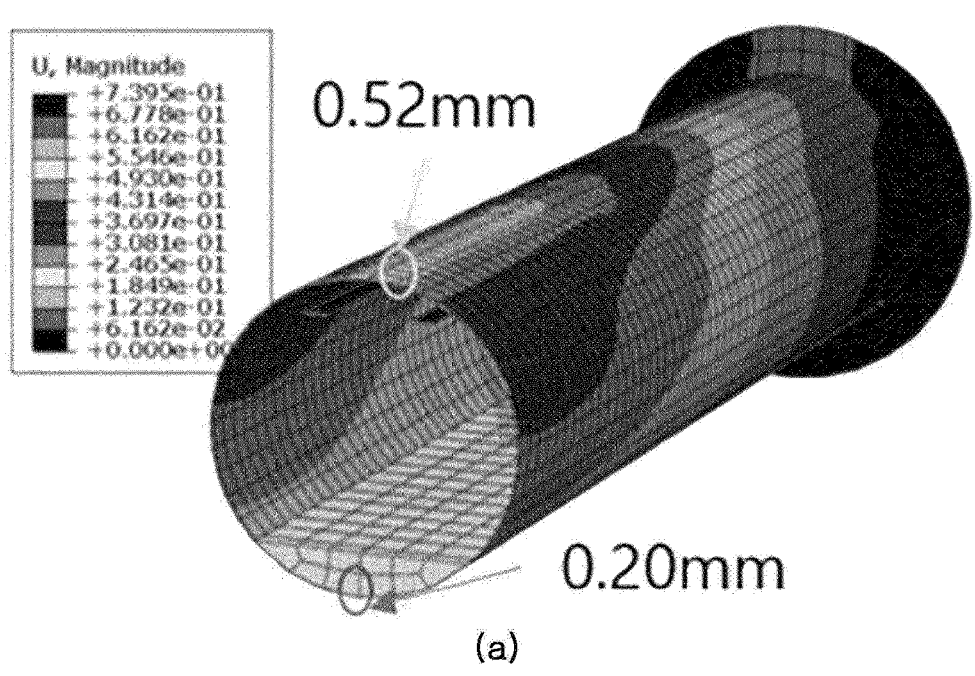
FIG. 12 is a simulation result illustrating a comparison of deflection deformation of the conventional tube and the guide tube of the present disclosure.
Figure 12:
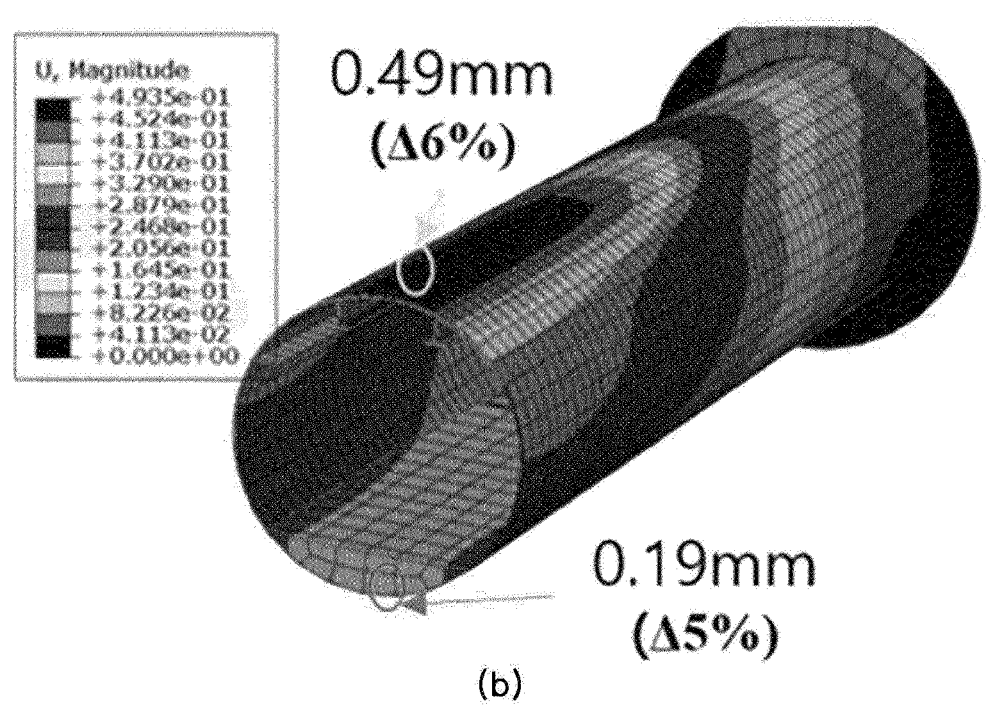

That is, FIG. 12 is a simulation result illustrating a comparison of deflection deformation of the conventional tube and the guide tube 1 of the present disclosure, and FIG. 12(a) illustrates a conventional form, and FIG. 12(b) illustrates the guide tube 1 of the present disclosure.

Here, in a case of prior art, deflection of 0.52 mm occurs at an upper end, but the guide tube 1 of the present disclosure deflects only by 0.49 mm, so it can be seen that there is an effect of improving a problem of deflection by about 6%, compared to the prior art.

In addition, in the case of the prior art, 0.20 mm of deflection occurs at a lower end, but the guide tube 1 of the present disclosure has only 0.19 mm deflection, so it can be seen that there is an effect of improving the problem of deflection by about 5%, as compared to the prior art.

As described above, in the guide tube 1 of the present disclosure, since the rail support member 30 can be installed in the rib member 20 without forming a through-hole in the tube main body member 10, it is possible to reduce a cost as the through-hole is formed obliquely in the tube main body member 10, and in addition, a problem in which an inside of the tube main body member 10 may not be ensured to be in a sub-vacuum state of about 0.001 atmosphere or less depending on reliability of a filling operation of the through-hole, since the operation for filling the through-hole is unnecessary.

Here, the rib member 20 of the guide tube 1 according to an embodiment of the present disclosure may be welded and coupled to the tube main body member 10 made of a metal material formed in a tube shape. In other words, the rib member 20 may be coupled thereto through direct welding without forming a separate through-hole for coupling to the inner surface of the tube main body member 10.

Figure 4:
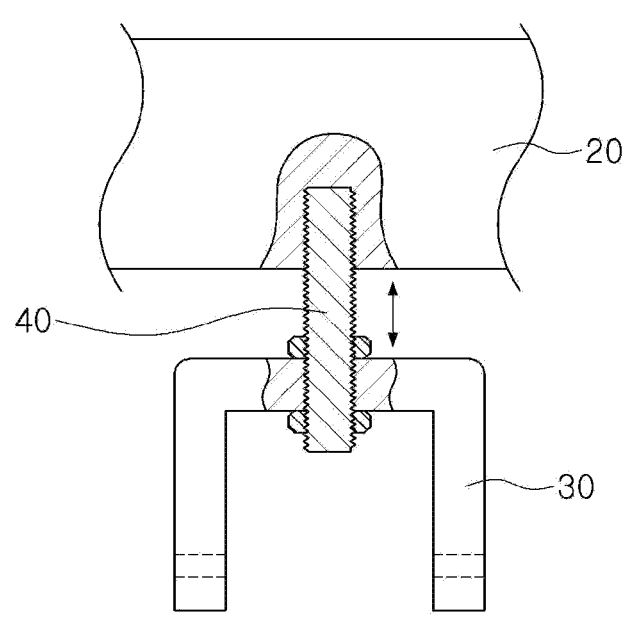
FIG. 4 is a partially cut sectional view illustrating the rib member and the rail support member coupled to the bolt member in the guide tube of the present disclosure.

FIG. 4 is a partially cut cross-sectional view illustrating a rib member 20 and a rail support member 30 coupled to a bolt member 40 in the guide tube 1 of the present disclosure. Referring to FIG. 4, the rail support member 30 of the guide tube 1 according to an embodiment of the present disclosure may be screwed and coupled to a bolt member 40, screwed and coupled or welded and coupled to the rib member 20, and connected to the rib member 20 via the bolt member 40.

That is, as the rail support member 30 is coupled to the bolt member 40 provided in the rib member 20, the rail support member 30 may be coupled to the rib member 20 coupled to the tube main body member 10.

Here, the bolt member 40 may be welded and coupled to the rib member 20, but may be screwed and coupled, to adjust a spacing therebetween while coupled to the rib member 20. As a result, the spacing between the rail support member 30 and the rib member 20 may be adjusted.

In addition, the rail support member 30 of the guide tube 1 according to an embodiment of the present disclosure may adjust a depth to be screwed and coupled to the bolt member 40, to adjust the spacing with the rib member 20.

That is, adjustment of the spacing between the rail support member 30 and the rib member 20 may be performed by adjusting a degree of coupling between the rib member 20 and the bolt member 40, but also by adjusting a degree of coupling between the rail support member 30 and the bolt member 40.

Figure 5:
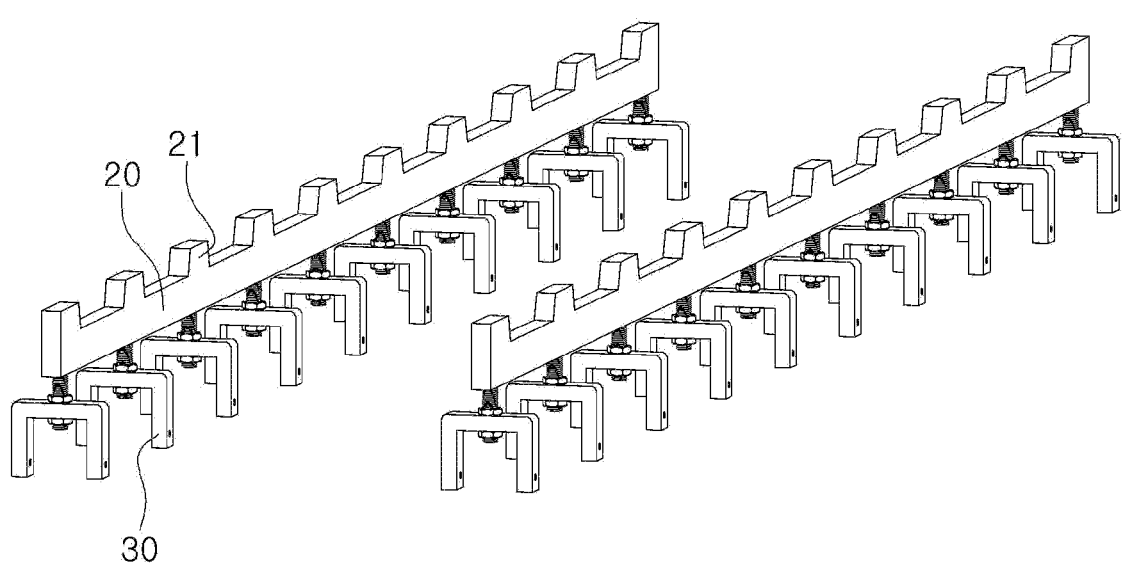
FIG. 5 is a perspective view illustrating an embodiment in which the rib member includes a coupling tab portion in the guide tube of the present disclosure.
Figure 6:
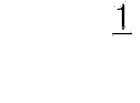
FIG. 6 is a perspective view illustrating a state in which the rib member including the coupling tab portion is coupled to the tube main body member in the guide tube of the present disclosure.
Figure 6:
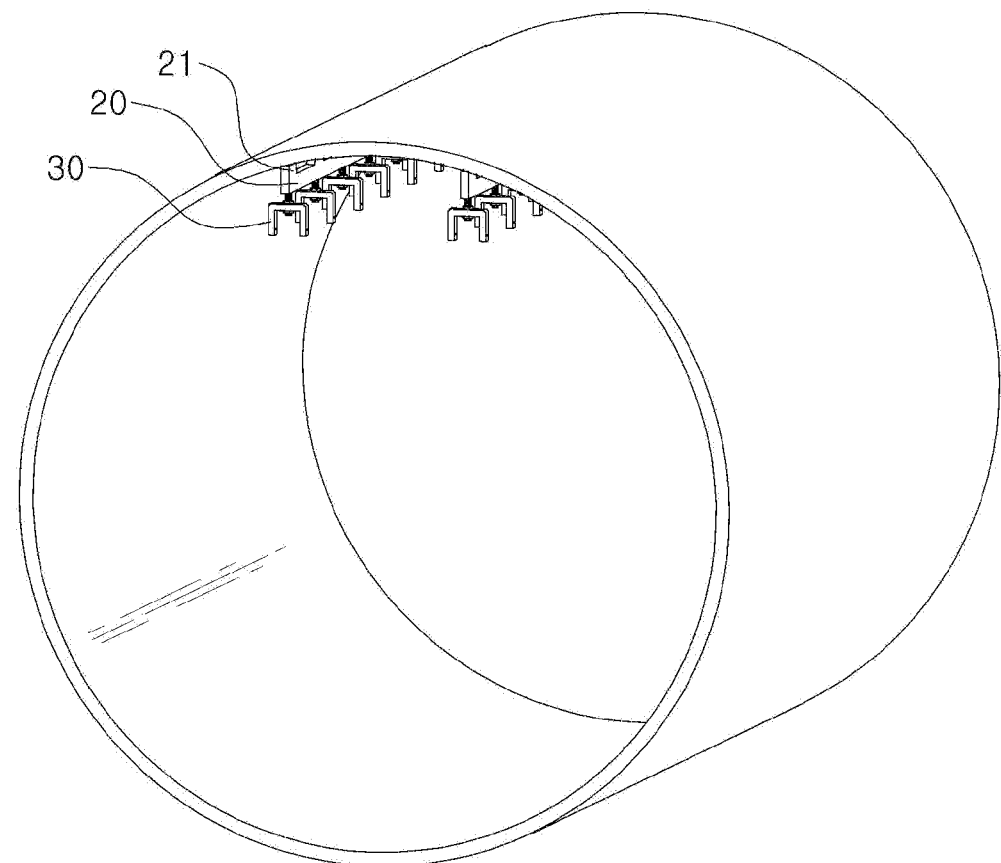

FIG. 5 is a perspective view illustrating an embodiment in which a rib member 20 includes a coupling tab portion 21 in the guide tube 1 of the present disclosure, and FIG. 6 is a perspective view illustrating a state in which a rib member 20 including a coupling tab portion 21 is coupled to a tube main body member 10 in the guide tube 1 of the present disclosure. Referring to the drawings, the rib member 20 of the guide tube 1 according to an embodiment of the present disclosure may include a coupling tab portion 21.

Here, the coupling tab portion 21 is formed to protrude in a direction of an inner surface of the tube main body member 10, is provided in plural in a longitudinal direction of the tube main body member 10, and is welded and coupled to the inner surface of the tube main body member 10.

As described above, since the rib member 20 is coupled to the tube main body member 10 through the coupling tab portion 21, it is possible to reduce a welding coupling portion when being welded and coupled to the tube main body member 10, so that a coupling operation may be easily performed.

Figure 7:
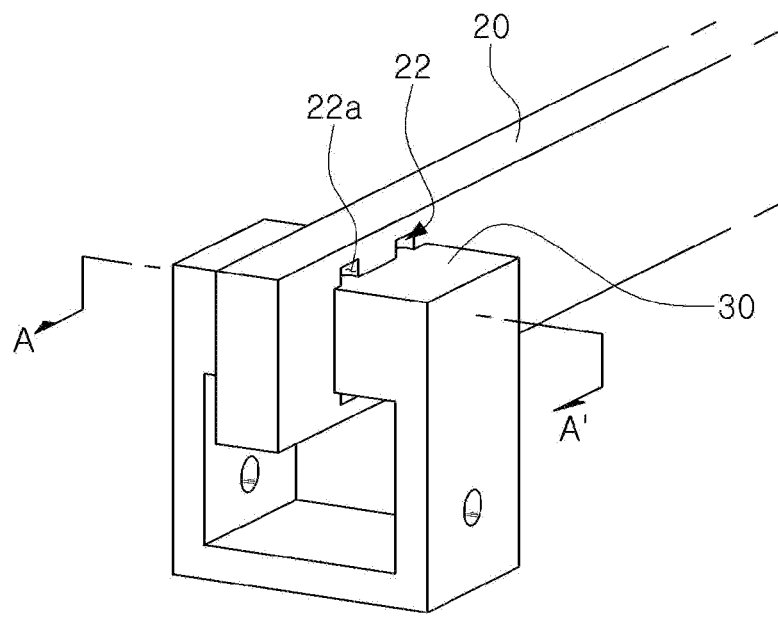
FIG. 7 is a perspective view illustrating an embodiment in which the rib member includes a friction damper portion in the guide tube of the present disclosure.
Figure 8:
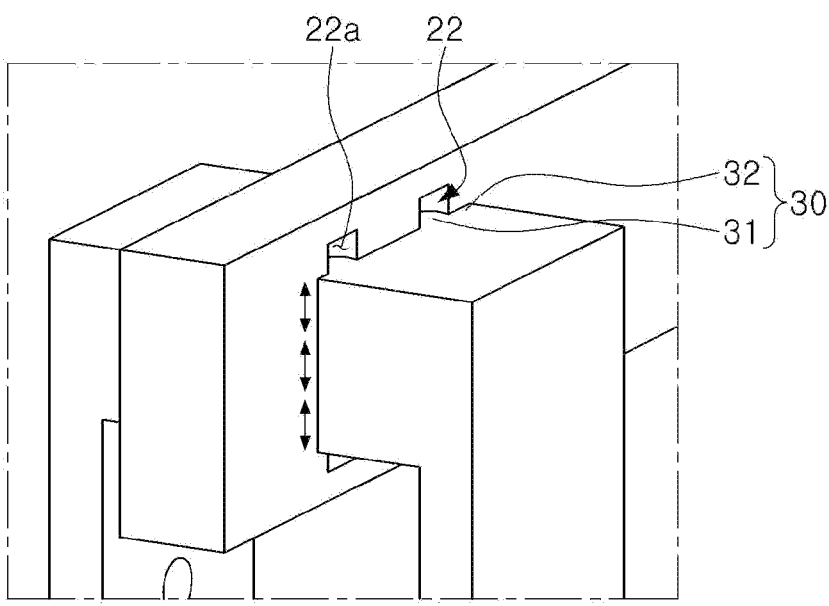
FIG. 8 is a perspective view illustrating an operating state of the friction damper portion in the guide tube of the present disclosure.

FIG. 7 is a perspective view illustrating an embodiment in which a rib member 20 includes a friction damper portion 22 in the guide tube 1 of the present disclosures, and FIG. 8 is a perspective view illustrating an operating state of the friction damper portion 22 in the guide tube 1 of the present disclosure. Referring to the drawings, the rib member 20 of the guide tube 1 according to an embodiment of the present disclosure may include a friction damper portion 22.

Here, the friction damper portion 22 may have a slit hole 22a in which the rail support member 30 is fitted to a portion of the slit hole and is connected, to absorb vibration energy of the rail support member 30.

That is, the friction damper portion 22 may dissipate vibration energy generated by the moving vehicle 3, external factors, and the like, as the friction damper portion 22 supports to move the rail support member 30 in a slit hole 22a shape direction.

In particular, the friction damper portion 22 uses frictional force acting between the rail support member 30 and the rail support member 30 as resistive force to absorb the vibration energy, thereby improving the problem caused by vibration.

That is, the slit hole 22a of the guide tube 1 according to an embodiment of the present disclosure is in frictional contact with the rail support member 30 to absorb vibration energy.

Here, the slit hole 22a of the guide tube 1 according to an embodiment of the present disclosure may be formed in a horizontal shape or an inclined shape in a width direction of the rib member 20.

A form of the slit hole 22a is not limited to the above-described form, and the slit hole 22a of the present disclosure may be used as long as it can effectively absorb vibration energy.

In addition, a buffer spring 22b may be provided in the slit hole 22a to more effectively absorb vibration energy, and a detailed description thereof will be described with reference to FIG. 9.

Figure 9:
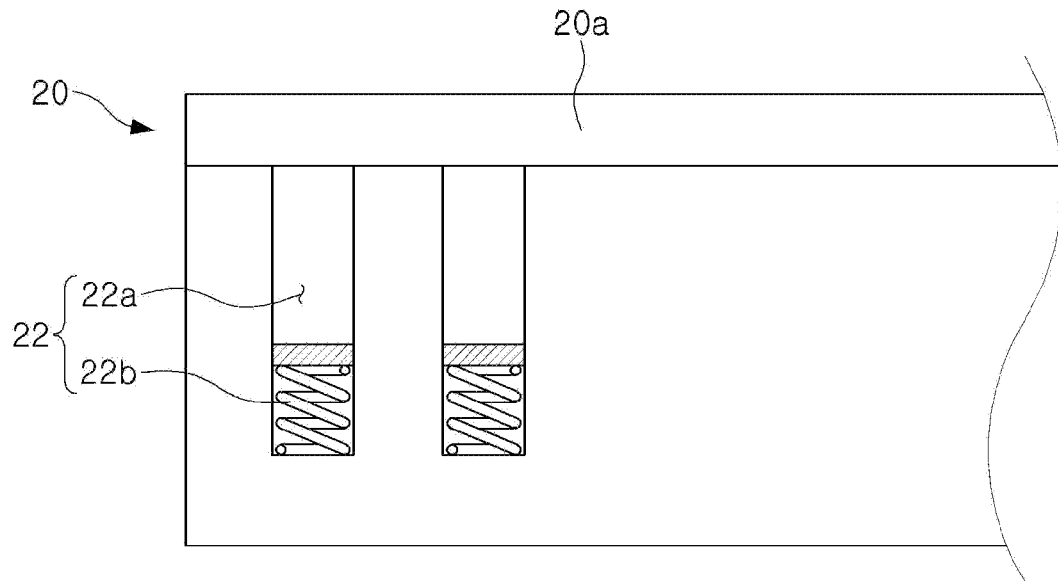
FIG. 9 is a side view illustrating an embodiment in which the friction damper portion includes a buffer spring in the guide tube of the present disclosure.

FIG. 9 is a side view illustrating an embodiment in which a friction damper portion 22 includes a buffer spring 22b in the guide tube 1 of the present disclosure. Referring to FIG. 9, the friction damper portion 22 of the guide tube 1 according to an embodiment of the present disclosure may include a buffer spring 22b provided in at least one end portion of the slit hole 22a.

That is, since the buffer spring 22b is provided in one end portion in a longitudinal direction of the slit hole 22a through which the rail support member 30 moves, the buffer spring 22b is disposed on a path on which the rail support member 30 moves by vibration. Accordingly, an elastic force of the buffer spring 22b becomes a resistive force to buffer the movement caused by the vibration of the rail support member 30, thereby dissipating vibration energy applied to the rail support member 30.

In other words, the vibration energy of the rail support member 30 may be dissipated as elastic energy of the buffer spring 22b in addition to being dissipated as friction energy with the slit hole 22a.

In order to install the rail support member 30 to be fitted to the friction damper portion 22, the rib member 20 may be configured such that an upper end portion of the slit hole 22a is opened so that a top portion thereof is separated.

That is, in the rib member 20, when the rail support member 30 is fitted to the slit-hole 22a in which an upper end portion thereof is opened, in a state in which a rib top portion 20a, which is a top portion, is separated, the rib top portion 20a may be disposed on the top portion again and coupled by welding, or the like, to be assembled to close the upper end portion of the slit hole 22a.

In addition, the rail support member 30 may include an insertion tab portion 31 and a stopper portion 32, so that a position thereof is not deviated while being moved from the slit hole 22a of the rib member 20 while dissipating vibration energy.

Figure 10:
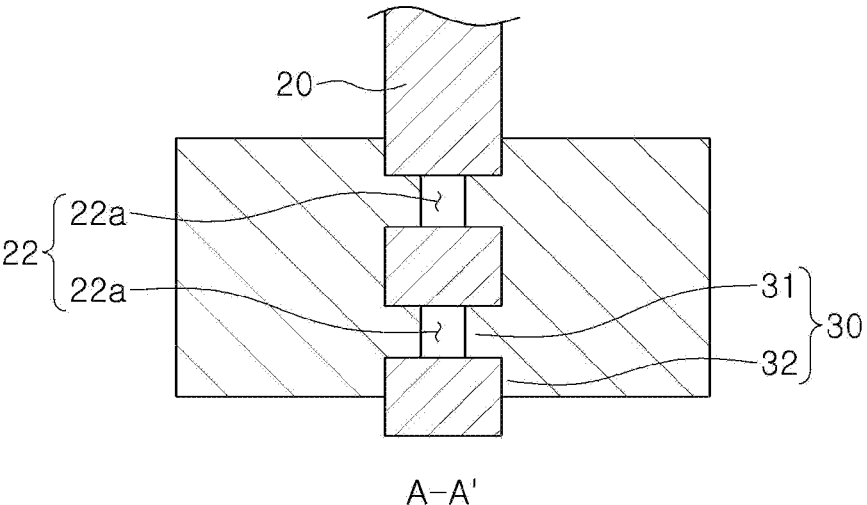
FIG. 10 is a plan view illustrating a cut cross-section of portion A-A' in FIG. 7.

That is, FIG. 10 is a plan view illustrating a cut section of part A-A' in FIG. 7. Referring to FIG. 10, the rail support member 30 of the guide tube 1 according to an embodiment of the present disclosure may include an insertion tab portion 31 and a stopper portion 32.

Here, the insertion tab portion 31 is configured to be fitted to the slit hole 22a. The stopper portion 32 is configured to protrude in at least one direction of the insertion tab portion 31 to form a step portion.

In other words, the insertion tab portion 31 is fitted to the slit hole 22a so that the rail support member 30 moves along the slit hole 22a, and serves to dissipate vibration energy transmitted to the rail support member 30. The stopper portion 32 serves to support not to be separated, when the insertion tab portion 31 moves along the slit hole 22a.

As showed in FIG. 10, the rail support member 30 is provided in a shape in which a portion of one side of a letter "□" is opened, and an insertion tab portion 31 is formed to protrude from this broken portion, and a stopper portion 32 may be formed in a form of a step therearound.

Figure 11:
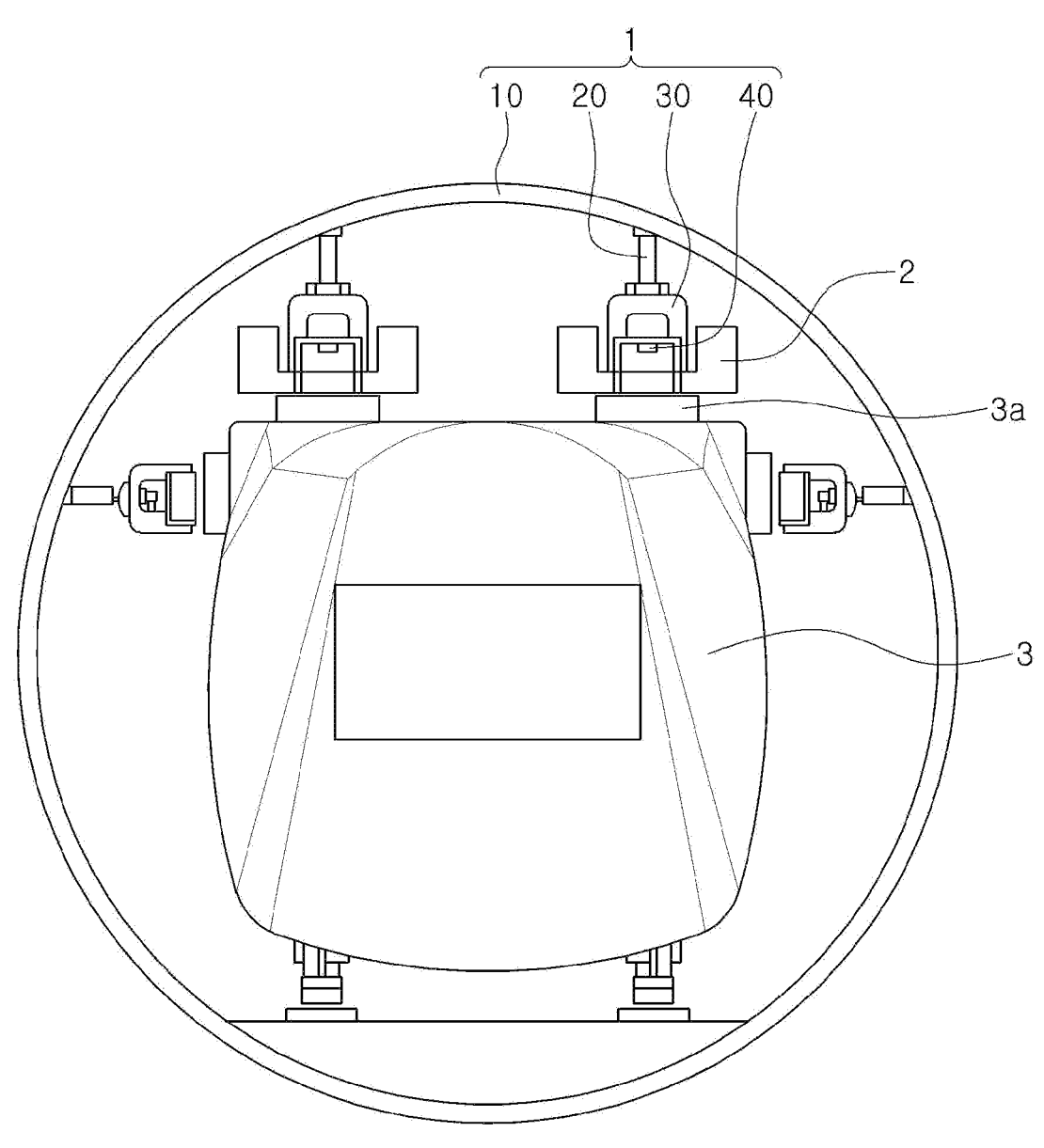
FIG. 11 is a front view illustrating a guide tube and a hyperloop device including the same of the present disclosure.

In the present disclosure, a hyperloop device provided with the guide tube 1 described above may be included. That is, FIG. 11 is a front view illustrating a guide tube 1 of the present disclosure and a hyperloop device including the same. Referring to FIG. 11, the hyperloop device according to another embodiment of the present disclosure may include the guide tube 1, an electromagnet member 2, and a moving vehicle 3.

Here, the electromagnet member 2 is configured to be coupled to the rail support member 30. The moving vehicle 3 is provided with a permanent magnet 3a facing the electromagnet member 2, and a transport of the moving vehicle 3 is adjusted by magnetic force applied between the electromagnet member 2 and the permanent magnet 3a, and is configured to have an accommodation space formed therein.

As described above, magnetic levitation and movement of the moving vehicle 3 may be performed by an action of mutual attraction and repulsion between the permanent magnet 3a and the electromagnet member 2.

The electromagnet member 2 may be configured to adjust magnetic force formation by adjusting a current applied to an electrical steel sheet.

Hereinafter, the present disclosure will be described in more detail through examples. However, it should be noted that the following examples are for illustrative purposes only and are not intended to limit the scope of the present disclosure. The scope of the present disclosure may be determined by matters described in the claims and matters able to be reasonably inferred therefrom. The subject of the present invention is not limited to the above. The subject of the present invention will be understood from the overall content of the present specification, and those of ordinary skill in the art to which the present invention pertains will have no difficulty in understanding the additional subject of the present invention.

While example embodiments have been shown and described above, it will be apparent to those skilled in the art that modifications and variations could be made without departing from the scope of the present disclosure as defined by the appended claims.

DESCRIPTION OF REFERENCE NUMERALS

1: GUIDE TUBE 2: ELECTROMAGNETIC MEMBER
3: MOVING VEHICLE 10: TUBE MAIN BODY MEM-
BER
20: RIB MEMBER 21: COUPLING TAB PORTION
22: FRICTION DAMPER PORTION 30: RAIL SUP-
PORT MEMBER
31: INSERTION TAB PORTION 32: STOPPER POR-
TION
40: BOLT MEMBER

The invention claimed is:

1. A guide tube, comprising:
a tube main body member;
a rib member arranged in a longitudinal direction of the tube main body member, and coupled to an inner surface of the tube main body member; and
a rail support member connected to the rib member,
wherein the rib member comprises a friction damper portion having a slit hole, and
wherein the rail support member is insertedly connected to a portion of the slit hole to absorb vibration energy of the rail support member.

2. The guide tube of claim 1, wherein the rib member is coupled to the tube main body member formed of a metal material formed in a form of a tube shape.

3. The guide tube of claim 1, wherein the slit hole is in frictional contact with the rail support member.

4. The guide tube of claim 3, wherein the slit hole is arranged horizontally or inclined to a width direction of the rib member.

5. The guide tube of claim 1, wherein the friction damper portion comprises a buffer spring provided in at least one end portion of the slit hole.

6. The guide tube of claim 1, wherein the rail support member comprises
an insertion tab portion fitted to the slit hole; and
a stopper portion protruding in at least one direction of the insertion tab portion to form a stepped portion.

7. The guide tube of claim 1, wherein the rail support member further comprises a bolt member that is (i) screwed and coupled to the rib member or (ii) welded and coupled to the rib member, and
wherein the bolt member connects the rail support member and the rib member.

8. A hyperloop device, comprising:
the guide tube of claim 1;
an electromagnet member coupled to the rail support member; and
a moving vehicle having a permanent magnet facing the electromagnet member, a transport of the moving vehicle being adjusted by magnetic force applied between the electromagnet member and the permanent magnet, and having an accommodation space arranged therein.

9. A guide tube of claim 1, comprising:
a tube main body member;

a rib member arranged in a longitudinal direction of the tube main body member, and coupled to an inner surface of the tube main body member; and a rail support member connected to the rib member, wherein the rib member comprises a coupling tab portion formed to protrude in a direction of the inner surface of the tube main body member, provided in plural in the longitudinal direction of the tube main body member, and coupled to the inner surface of the tube main body member.

10. A guide tube of claim 7, comprising:

a tube main body member;

a rib member arranged in a longitudinal direction of the tube main body member, and coupled to an inner surface of the tube main body member; and a rail support member connected to the rib member, wherein the rail support member comprises a bolt member that is (i) screwed and coupled to the rib member or (ii) welded and coupled to the rib member, wherein the bolt member connects the rail support member and the rib member, and wherein the rail support member is configured to adjust a depth to be screwed and coupled to the bolt member, to adjust a spacing with the rib member.

\* \* \* \* \*